United States Patent [19]
Gruber

[11] Patent Number: 4,865,637
[45] Date of Patent: Sep. 12, 1989

[54] FILTER CARTRIDGE

[76] Inventor: Thomas J. Gruber, 6805 Mayfield Rd., Bldg. B, Ste. 1114, Mayfield Heights, Ohio 44124

[21] Appl. No.: 247,764

[22] Filed: Sep. 21, 1988

Related U.S. Application Data

[63] Continuation-in-part of Ser. No. 174,100, Mar. 28, 1988.

[51] Int. Cl.$^4$ .............................................. B01D 46/00
[52] U.S. Cl. .............................. 55/502; 55/DIG. 31; 55/497; 55/473; 55/337; 55/316; 210/493.3; 29/902
[58] Field of Search .................. 55/359, 337, 497–499, 55/473, 500, 502, 316, 521, DIG. 31; 210/493.3; 29/400 C

[56] References Cited

U.S. PATENT DOCUMENTS

| | | | |
|---|---|---|---|
| 2,252,724 | 8/1941 | Myers | 55/502 |
| 2,316,526 | 4/1943 | McDonald | 160/382 |
| 2,664,172 | 12/1953 | Butterfield | 55/DIG. 31 |
| 3,170,875 | 2/1965 | Swett | 210/465 |
| 3,747,772 | 7/1973 | Brown | 210/493 |
| 4,438,057 | 3/1984 | Sudselh | 55/497 |
| 4,584,005 | 4/1986 | Allan et al. | 55/499 |

*Primary Examiner*—Bernard Nozick
*Attorney, Agent, or Firm*—Fay, Sharpe, Beall, Fagan, Minnich & McKee

[57] ABSTRACT

A filter cartridge for treating a fluid passing therethrough includes a filtering medium and a support container for holding the filtering medium. The support container includes a solid side wall having first and second ends and a pair of perforated end walls, one located on each end of the side wall. A pair of connectors is provided for securing a respective one of the end walls to a respective end of the side wall. A sleeve secures the connectors to the side wall in a substantially leak-proof manner.

21 Claims, 4 Drawing Sheets

FIG. I
(PRIOR ART)
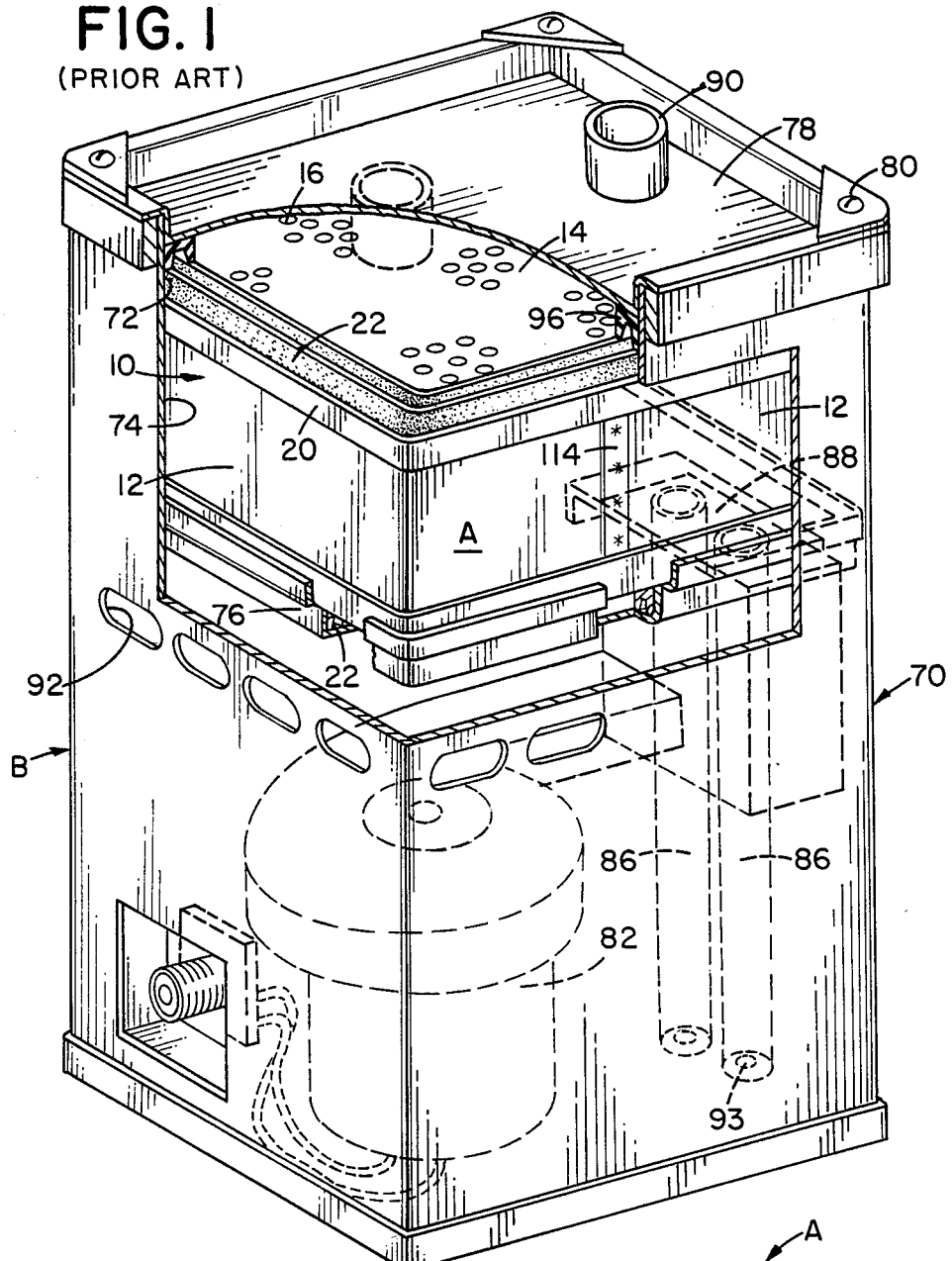
FIG. IA
(PRIOR ART)
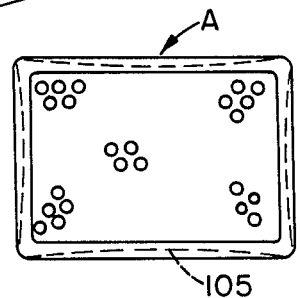

FILTER CARTRIDGE

BACKGROUND OF THE INVENTION

This application is a continuation-in-part of patent application Ser. No. 174,100, filed on Mar. 28, 1988 and still pending.

This invention generally pertains to filtering assemblies. More specifically, the present invention relates to a leak-proof filter cartridge.

The invention is particularly applicable to a filter cartridge which treats contaminated air passing therethrough. However, it will be appreciated by those skilled in the art that the invention has broader applications and may be useful also in various other filtering environments where it would be advantageous to provide a substantially leak-proof filter.

Charcoal filters as well as paper filters (which can be provided in series with charcoal filters) are typically used in breathing apparatus for fire fighters, miners, soldiers in the field, and in many different types of industrial environments. Certain of these filter elements or cartridges are utilized in a breathing device or respirator unit which incorporates a fan for drawing or pushing air through the filter element. Another environment utilizing filter cartridges, housed in a large assembly including a fan, is a survival shelter adapted for use as a place of refuge during warfare, industrial accidents, earthquakes, terrorism, sabotage, and the like. Such conventional shelters are provided with various filtration devices for filtering the air of the environment such as the so-called "NBC", (nuclear, biological, chemical) filtration devices. These devices generally house a filtration cartridge, which may be an activated charcoal cartridge or the like, for filtering the air which is allowed to enter the shelter.

In any of these environments, problems are encountered when the filter cartridges leak so that unfiltered air is allowed to flow along the exterior periphery of the cartridge between the ends of the cartridge as the cartridge is seated in a filtration device. Obviously, such unfiltered air can be very hazardous to the health of those individuals breathing the air meant to be cleaned by the filtration device. Similarly, in an environment where the filter cartridge is meant to do some type of industrial filtration, any fluid left unfiltered would defeat the purpose of the filtration assembly and would be similarly disadvantageous, even if it would not be hazardous to health.

It has now been ascertained that certain currently available filtration cartridges, which include a support container side wall holding a filtration medium as well as a pair of perforated end walls secured to the side wall by a pair of picture frame-like end covers, do leak around the end covers so that unfiltered air is capable of flowing along the exterior periphery of the frame between the ends of the cartridge. Obviously, such cartridges cannot be used as manufactured and, unless they can be sealed in an economical manner, will have to be discarded.

Accordingly, it has been considered desirable to develop a means for refurbishing conventional filter cartridges which are prone to fluid leakage as well as to develop a filter cartridge which is not as prone to fluid leakage, which types of cartridges would overcome the foregoing difficulties and others and meet the above stated needs while providing better and more advantageous overall results.

BRIEF SUMMARY OF THE INVENTION

In accordance with the present invention, a new and improved filter cartridge is provided for treating a fluid passing therethrough.

More particularly in accordance with this aspect of the invention, the cartridge comprises a filtering medium and a support container for holding the filtering medium. The support container comprises a solid side wall having first and second ends and a pair of perforated end walls, one located at each end of the side wall. A pair of connector means is provided for securing a respective one of the end walls to a respective end of the side wall. A sleeve means secures the pair of connector means to the side wall in a substantially leak-proof manner.

According to another aspect of the present invention, a filter cartridge is provided for treating a fluid passing therethrough.

More particularly in accordance with this aspect of the invention, the cartridge comprises a frame including a side wall having first and second ends and a filter medium which is adapted to be held in the frame. A pair of perforated end walls are provided with one located at each end of the side wall. A pair of end covers each secure a respective one of the end walls to a respective end of the frame. A seal means is provided for securing the end covers to the frame in a substantially leak-proof manner. The seal means comprises a sleeve layer made of a thermoplastic material which covers, and is heat shrunk onto, the frame and at least a portion of each of the pair of end covers.

According to still another aspect of the invention, a method is provided for refurbishing a filter cartridge which is prone to fluid leakage.

More particularly in accordance with this aspect of the invention, the method comprises the steps of providing a filter cartridge having a frame, including a side wall and first and second perforated end walls which are each secured to a respective edge of the side wall by a respective one of the first and second end covers, and providing a heat shrinkable thermoplastic material. The material and the filter cartridge are then brought into an adjoining relationship. The material is thereafter heat shrunk onto the frame so that the material covers the side wall and at least a portion of each end cover thereby sealing the end covers to the frame.

One advantage of the present invention is the provision of a new and improved filter cartridge for treating a fluid passing therethrough.

Another advantage of the present invention is the provision of a filter cartridge which is not as prone to fluid leakage as are conventional filter cartridges.

A further advantage of the present invention is the provision of a filter cartridge with resilient end covers which are better able to sealingly engage the adjacent cartridge side wall and end wall and to provide a sealing lip for sealing against an adjacent surface.

A still further advantage of the present invention is the provision of a filter cartridge with end covers which are integral with the perforated end walls of the cartridge.

Still another advantage of the present invention is the provision of a sleeve means for sealing a pair of end covers to a filter cartridge frame.

Yet another advantage of the present invention is the provision of a method for refurbishing a filter cartridge which is prone to fluid leakage.

Still other benefits and advantages of the invention will become apparent to those skilled in the art upon a reading and understanding of the following detailed specification.

BRIEF DESCRIPTION OF THE DRAWINGS

The invention may take form in certain parts and arrangements of parts, preferred embodiments of which will be illustrated in the accompanying drawings which form a part hereof and wherein:

FIG. 1 is a perspective, partially broken away view of a conventional filter cartridge housed in a filtering assembly which is known to the art;

FIG. 1A is a reduced top plan view of the conventional filter cartridge of FIG. 1;

DETAILED DESCRIPTION OF THE PREFERRED EMBODIMENTS

Figure 4:
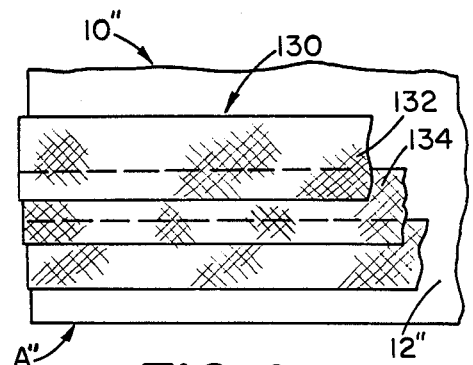
FIG. 4 is a fragmentary view of a refurbished filter cartridge according to a second preferred embodiment of the present invention.
Figure 5:
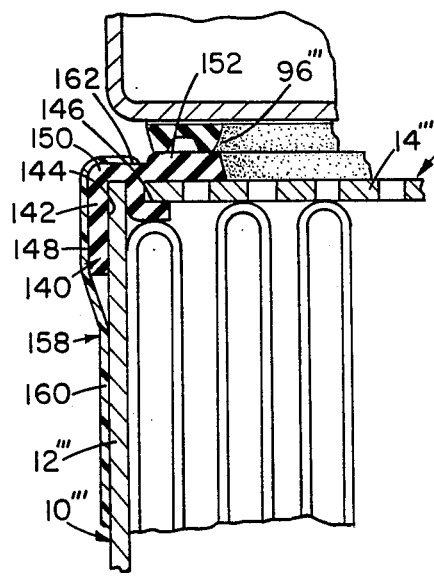
FIG. 5 is a fragmentary view of a first new type of filter cartridge according to a first preferred embodiment of the present invention.
Figure 6:
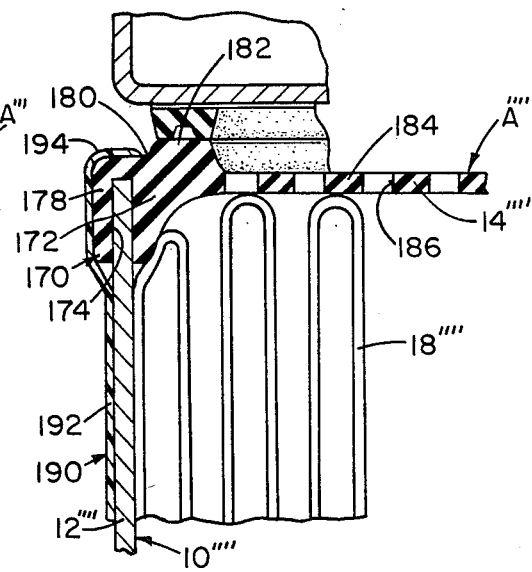
FIG. 6 is a fragmentary view of a second new type of filter cartridge according to a second preferred embodiment of the present invention; and, FIG. 7 is a fragmentary cross sectional view through a two stage filter employing a third new type of filter cartridge according to a third preferred embodiment of the present invention.
Figure 3:
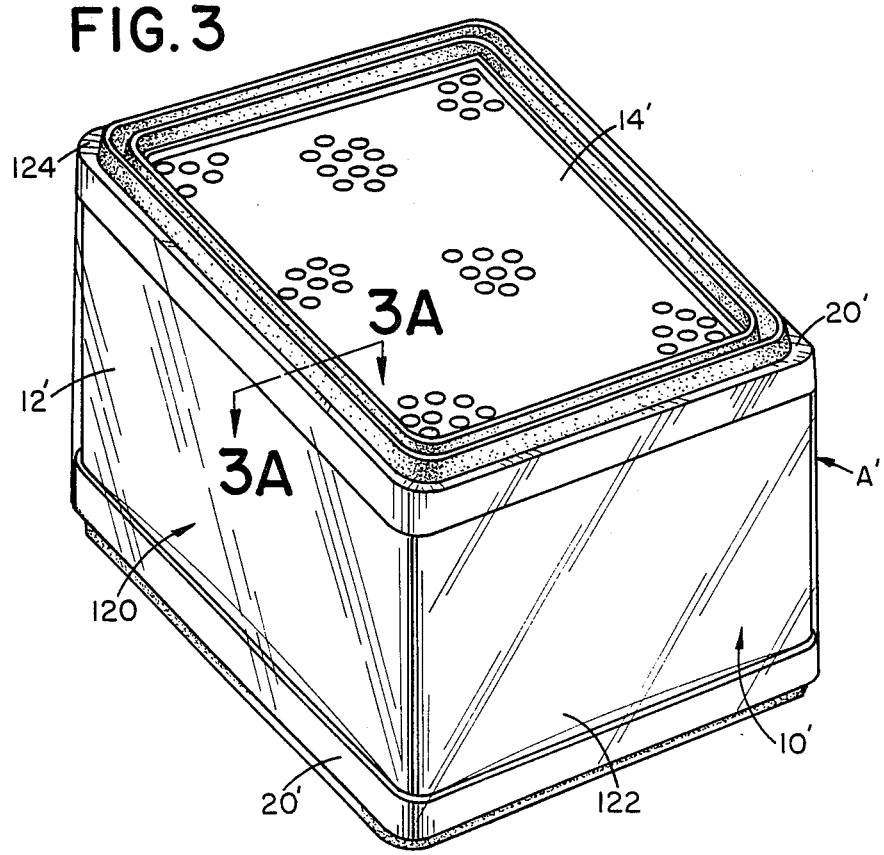
FIG. 3 is a perspective view of a refurbished filter cartridge according to a first preferred embodiment of the present invention.
Figure 7:
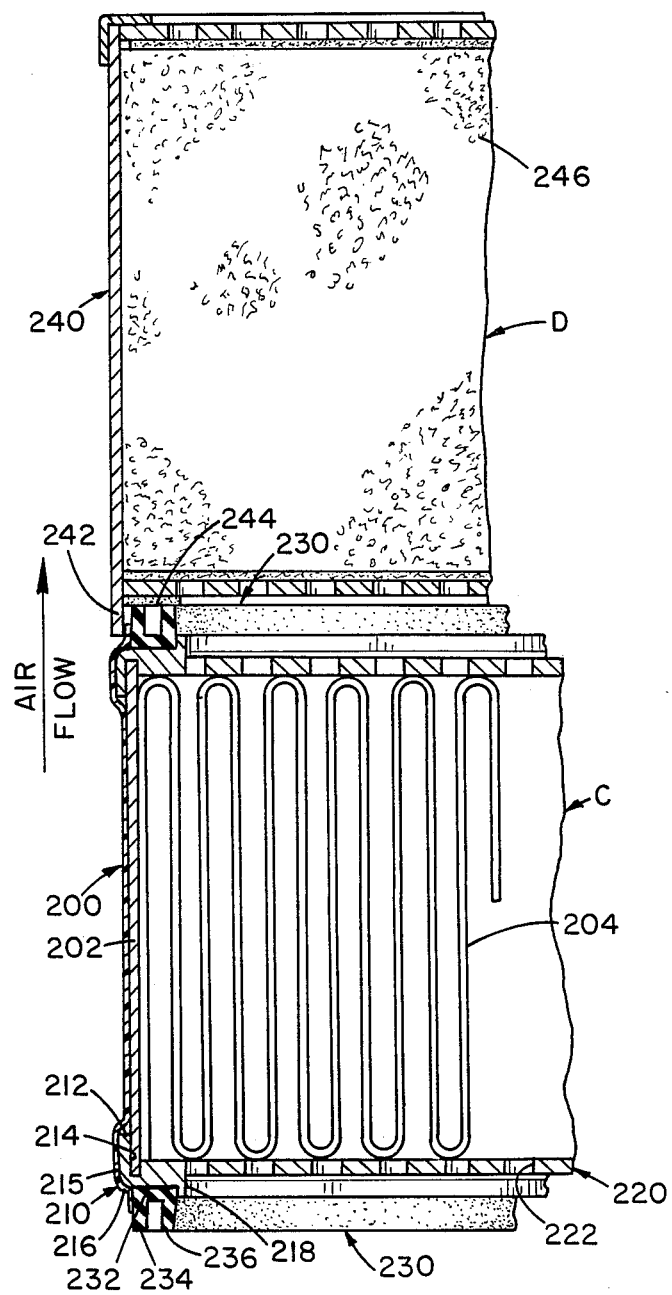

Referring now to the drawings, wherein the showings are for purposes of illustrating preferred embodiments of the invention only and not for purposes of limiting same, FIGS. 3 and 4 show the subject new invention in the way of refurbished conventional filter cartridges while FIGS. 5, 6, and 7 illustrate new types of filter cartridges. While the filter cartridge illustrated is primarily designed for and will hereinafter be described in connection with the filtering of air for breathing, it should be appreciated that the overall inventive concept of a substantially leak-proof filter cartridge could also be adapted for use in many other environments where filter cartridges are utilized.

More particularly and with reference now to FIG. 1, a conventional filtering assembly A includes a support body 10 comprised of a plurality of side walls 12 as well as top and bottom end walls 14 (only one of which can be seen in FIG. 1). A plurality of perforations 16 are located in the end walls to allow fluid to pass therethrough. A conventional filtering medium 18 is held within the support frame 10 as is more evident from FIG. 2. The filtering medium 18 can be a pleated paper filter as is illustrated or charcoal as shown in FIG. 7. The end walls 14 are each held by a respective frame or end cover 20 which fits over one edge of the side walls 12 of the support body 10 and an outer edge of the respective end wall. A two lip seal or gasket 22 is secured to the frame 20 such that the seal is positioned around the edges of the end walls 14 and is designed to allow the support body 10 to sealingly engage a conventional breathing apparatus B.

More specifically, the breathing apparatus B includes a housing 70 having a top opening 72 and a recess 74 which is defined between the top opening and an intermediate plate 76 for receipt of the filtering assembly A. A cover plate 78, secured by suitable conventional fasteners 80, encloses the recess 74 and is meant to seal the filtering assembly A against communication with the environment except through suitable apertures in the apparatus B. A suitable conventional fan 82 cooperates with a pair of cyclone separator cylinders 86 to withdraw air from the environment and clean the air. The fan 82 communicates with the environment through slots 92 to withdraw air from the environment and send it to the pair of cyclone separators which will remove larger dirt particles from the air and send the air to the recess 74. A diffuser plate 93 sits atop the outlets of the cylinders 86 to diffuse the air which is transmitted by the fan along the entire bottom surface of the filtering assembly A. The dirt particles are expelled by the separators through small apertures 88 provided on the bottom faces of the separators. After the air is filtered by the assembly A, it is withdrawn through suitable outlets 90 provided in the cover plate 78.

It is intended that the seal elements 22 provided on the top and bottom walls of the filtering assembly A be compressed in the recess 74 of the housing 70 by cooperation with a suitable seal strip 96 adhered to the bottom face of the top plate 78 around the periphery thereof in order to enable the seals 22 to maintain a gas tight compression seal with respect to the breathing apparatus recess 74. This prevents the air which exits the diffuser plate 88 from seeping around the edges of the support frame between it and the walls of the housing 70. Such air would be very disadvantageous, and quite likely dangerous, since it would not be filtered and the harmful elements therein would not be scrubbed therefrom.

Figure 2:
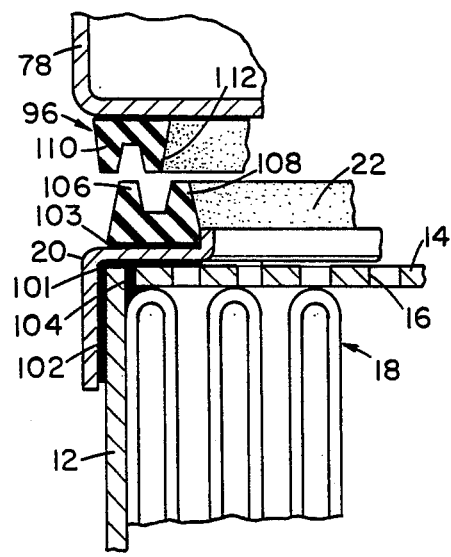
FIG. 2 is an enlarged cross sectional view of a portion of the conventional filter cartridge and filtering assembly of FIG. 1.

It has been determined that conventional filter elements A installed in the conventional breathing apparatus B have severe leakage problems through the sides of the filter frame 20 as well as across the upper or outlet gasket 22 as is illustrated in FIG. 2. More specifically, the frames 20 should be either soldered or glued to the side wall 10 and the perforated end walls 14. Similarly, the gaskets 22 are meant to be glued to the frame 20. In order to reduce manufacturing costs, the frame 20 is now generally just glued as at 101 to the respective end of the side wall 12 and the respective end wall 14. However, once such glue gives way, a gap 102 can be formed between the frame and the side wall which can allow for a flow of untreated air from the bottom frame member 30 around the exterior periphery of the side wall. In addition, when the gasket 22, which is meant to be glued to the frame 20 as at 103, is no longer secured in place, it can slide on the frame.

Also, in one type of filtering assembly A, the pleated paper filter is meant to be cemented in place as at 104. Sometimes the side walls 12 take on a "narrow waisted" appearance at the mid-points, as is illustrated in dotted lines at 105 in FIG. 1A, either due to a shrinkage of the cement which holds the pleated paper filter 18 in place or due to a compression of the side walls during assembly with the filter element. Upon assuming this shape, the side walls no longer contact the frames tightly and another leakage path is thereby provided.

As is illustrated in FIG. 2, the seal element or gasket 22 preferably comprises a seal body provided with a pair of spaced lips 106, 108. Given this somewhat "U"-shaped cross-section of the gasket which is cemented to both ends of the filter, the one on the discharge end of the filter is required to match perfectly with the seal strip or gasket 96 that is similarly shaped and provided with first and second lips 110, 112. In fact, there is a frequent mismatch resulting in the tips of the two gaskets not touching each other as is illustrated in FIG. 2. This allows a major path for leakage of filtered air which escapes to the atmosphere rather than being directed into the breathing system as desired.

Yet another path of leakage is at a seam area 114 where the two end sections of the rectangular side wall 12 are secured to each other, as is illustrated in FIG. 1. If this weld joint is cracked in some way, air can leak out of the support body 10 at that seam without being adequately filtered.

The conventional filter is rated at 20 cfm (cubic feet per minute) with a 1.25" pressure drop. However, as an indication of how it easy it is to lose a major amount of the filtered air flow through a crack or fault, a seam in the cartridge, or a mismatch of gaskets in the filter retention system, a calculation cf the amount of air lost shows that for 10" pressure at the blower outlet feeding into the air cleaner a 1 cfm loss occurs through a 0.134" diameter hole and a 5 cfm loss occurs through a 0.30" diameter hole. With such losses, it is difficult to filter an adequate amount of air through the conventional filter cartridge. Accordingly, the elimination of such air leakage would be highly beneficial in enabling a sufficient amount of air to be filtered through the cartridge and not lost due to leakage problems.

With reference now to a first preferred embodiment illustrated in FIG. 3, the invention is there shown in connection with a method for refurbishing a conventional filter cartridge which is prone to fluid leakage. For ease of illustration and appreciation of this embodiment, like components are identified by like numerals with a primed (') suffix and new components are identified by new numerals.

In FIG. 3, a filtering assembly A' comprises a support body 10' having side walls 12' and end walls 14'. A pair of frames 20' secure the end walls to the side walls.

Figure 3A:
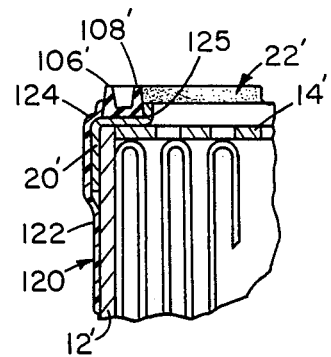
FIG. 3A is an enlarged cross-sectional view of a portion of the filer cartridge of FIG. 3 along lines 3A—3A.

In this embodiment, a sleeve means 120 is used for securing the pair of frames 20' to the body side wall 12' in a substantially leak-proof manner. As best illustrated in FIG. 3A, the sleeve means can comprise a sleeve body made of a tubular thermoplastic material and including a central section 122 which overlies the side wall 12' and a pair of end sections 124 (only one of which is visible in FIG. 3) for overlying at least a portion of each of the end frames 20' and a sealing gasket 22'. The sleeve is made out of a suitable shrink wrap material such as a heat shrinkable polyolefin tube, a heat shrinkable TEFLON brand plastic tube, a semi-rigid polyvinylidene fluoride tube, or a polyvinyl chloride (PVC) tube. In each instance, the tubular shrink wrap material will encapsulate the filter assembly by drawing together the end frames 20' on the side walls 12' to minimize or eliminate air leaks therethrough while also eliminating the necessity to solder or glue the frame members 20' to either the side wall 12' or the end walls 14'.

It should be appreciated that there will be a precise sizing of the length of the shrink wrap tubular material necessary in order that the upper and lower edges on the ends 124 of the shrink wrap material not interfere with a pair of sealing lips 106', 108' of the gasket 22'. Another advantage of the tube is that it will help in securing the gasket 22' in place against a flange 125 of the frame 20' even when the adhesive that is meant to hold the gasket in place on the frame has lost its effectiveness.

With reference now to a second embodiment for refurbishing conventional filter assemblies that leak, attention is directed to FIG. 4. For ease of illustration and appreciation of this alternative, like components are identified by like numerals with a double primed (") suffix and new components are identified by new numerals.

In FIG. 4, a filtering assembly A" includes a support frame 10" which is provided with a side wall 12" that is covered by a sleeve means 130 which is comprised of a number of overlapping strips 132, 134 of a suitable shrink wrap material. In one embodiment, the shrink wrap can be a one and one half inch wide tape which has an adhesive layer provided on one side such as 3M INSULTITE brand heat shrinkable polyolefin tape. During the heat shrinking process, the tape shrinks to 70% of its preshrunk size and the adhesive side melts and adheres the several layers together to form an airtight barrier. Of course, it should be recognized that other types of conventional heat shrink tapes can also be utilized as required.

With reference now to a first preferred embodiment of a new filter cartridge, FIG. 5 illustrates an improved design for the filter assembly. For ease of illustration and appreciation of this alternative, like components are identified by like numerals with a triple primed (''') suffix and new components are identified by new numerals.

In FIG. 5, a filtering assembly A''' includes a support frame 10''' that comprises a side all 12''' and a pair of end walls 14''' (only one of which is illustrated). Securing the end walls to the side wall is a frame 140 having a body 142 which includes a first groove 144 for accommodating an end of the side wall 12''' and a second, spaced, groove 146 extending transversely to the first groove for accommodating the end wall 14'''. The frame 140 has a smooth side face 148 which merges into an end face 150. Provided on a radially inner portion of the end face is a raised integral seal area 152 which cooperates with a facing seal 96'''.

The frame is made of a suitable resilient material such as a rubber or plastic material which is capable of withstanding the environmental extremes to which the filter assembly A''' will be exposed. Because the frame 140 is made of a resilient material, the grooves 144 and 146 can be so sized as to closely accommodate the side wall 12''' and end wall 14''', respectively, and therefore obviate the need for separate adhesive means for securing these structural elements to the frame.

In order to provide a leak proof seal around the filter assembly A''', a sleeve means 158 secures the frame, and hence, the end wall to the side wall. The sleeve means 158 includes a central section 160 which covers the side wall 12''' and an end section 162 which covers a portion of the end face 150 of the frame 140. Since the sleeve means is made of a shrink wrap type material, upon shrinkage, the sleeve "squeezes" the assembly together and seals the filter assembly against leakage between the frame and the side wall as well as between the frame and the end wall.

A second preferred embodiment of a new filter cartridge according to the invention is illustrated in FIG. 6. For ease of illustration and appreciation of this alternative, like components are identified by like numerals with a quadruple primed ("'''') suffix and new components are identified by new numerals.

In this embodiment, the filtering assembly A'''' includes a support frame 10'''' having a side wall 12'''' for holding a filtering medium 18''''. An end frame 170 is provided at the respective ends of the side wall 12''''. Each end frame comprises a body 172 that is provided with a first groove 174 for accommodating an end of the side wall 12''''. The body includes a side face 178 and an end face 180 which includes on a portion radially inwardly of the side wall 12'''' a raised integral seal area 182. In this embodiment, a support body end wall 184 is integral with the frame 170 and extends radially inwardly from the seal area 182. The end wall 184 includes a plurality of suitable perforations 186 to allow fluids such as gases to flow through the filtering medium 18''''.

The frame 170 is made of a suitable resilient material which can be formed into a perforated end wall as well as providing adequate sealing characteristics for the seal area 182. Additionally, the frame is made of such a resilient material that it can flex outwardly to accommodate the side wall 12'''' and then clasp the side wall in a fairly secure manner.

A sleeve means 190 is adapted to extend over the side wall 12'''' and secure the two frame sections, and hence the end walls, to the side wall. In this embodiment, the sleeve means includes a central section 192 extending over and covering the side walls 12'''' and end sections 194 each of which is designed to extend over at least a portion of a respective one of the frame end faces 180.

As with the embodiment of FIG. 5, the sleeve means is made of a shrink wrap material, which when shrunk onto the filter assembly, will squeeze the two end frames 170 tightly into engagement with the side wall 12'''' in order to ensure that there is no leakage around the end frames.

A third preferred embodiment of a new filter cartridge according to the invention is illustrated in FIG. 7. In this embodiment, a filter assembly C is used in a series arrangement with a charcoal filter D. In this arrangement, which can be suitably configured to fit in the breathing apparatus B, the air to be filtered will first flow through a pleated paper filter and then charcoal granules.

The filtering assembly C includes a support frame 200 which is provided with a side wall 202 that encloses a filtering medium 204 in the way of a pleated paper filter. An end frame 210 is provided at the respective ends of the side wall 202. Each end frame comprises a body 212 that is provided with a first groove 214 for accommodating an end of the side wall 202. The body includes a side face 215 as well as an end face 216 that is provided on a radially inner periphery thereof with an outwardly extending lip 218. In this embodiment, a support body end wall 220 is integral with the frame 210 and extends radially inwardly from the lip 218. The end wall 220 includes a plurality of suitable perforations 222 in order to allow fluids to flow through the filtering medium 204.

In contrast to the embodiment illustrated in FIG. 6, the frame 210 and end wall 220 are made of a metallic material. For this reason, a separate seal element 230 is secured such as by a conventional glue as at 232 to the frame 210. The seal 230 may comprise a seal body having a U-shaped cross-section provided with a pair of spaced lips 234, 236.

The charcoal filter D can be provided with a frame 240 which is so configured that an end section 242 houses the upper filter gasket 230. The tips 234, 236 of the upper gasket contact a cloth or felt gasket 244 as is illustrated. The air is thus filtered first through the pleated paper material 204 and then through a granulated charcoal material such as activated charcoal 246 before being exhausted from the combined filter assembly. Such filtering may be advantageous in a situation where larger particles need to be separated from the air through the use of the paper filter so that the air can then be further filtered by the activated charcoal 246.

The invention has been described with reference to the preferred embodiments. Obviously, modifications and alterations will occur to others upon the reading and understanding of this specification. It is intended to include all such modifications and alterations insofar as they come within the scope of the appended claims or the equivalents thereof.

Having thus described the preferred embodiments, the invention is now claimed to be:

1. A filter cartridge for treating a fluid passing therethrough, said cartridge comprising:
   a filtering medium;
   a support container for holding said filtering medium, said support container comprising:
      a solid side wall having first and second ends;
      a pair of perforated end walls, one located on each end of said side wall, and
      a pair of connector means each for overlapping and securing a respective one of said end walls to a respective end of said side wall; and,
   a sleeve means for securing said pair of connector means to said side wall in a substantially leak proof manner.

2. The cartridge of claim 1 wherein said connector means comprises a resilient body which is integral with said perforated end wall and which is provided with a first groove for accommodating said support container side wall and a sealing lip that extends approximately normal to said end plate.

3. The cartridge of claim 1 wherein said sleeve means comprises a sleeve body made of a tubular thermoplastic material which is heat shrunk over said side wall and at least a portion of said connector means.

4. The cartridge of claim 1 wherein said sleeve means comprises a sleeve body made of a plurality of overlapping windings of a thermoplastic tape material which is heat shrunk over said side wall and at least a portion of said connector means and wherein the windings of tape adhere to each other.

5. The cartridge of claim 1 wherein said connector means comprises a rigid body which is integral with said perforated end wall and is provided with a first groove for accommodating said support container side wall and at least one resilient sealing lip secured to an end wall of said rigid body adjacent said perforated end wall.

6. The cartridge of claim 1 wherein said connector means comprises a resilient body which is provided with a first groove for accommodating said support container side wall, a second groove for accommodating said perforated end wall, and a sealing lip extending approximately normal to said second groove.

7. The cartridge of claim 6 wherein said first groove is positioned approximately normal to said second groove.

8. The cartridge of claim 1 wherein said connector means comprises a pair of picture frame end covers each having a first leg which extends over a portion of said side wall and a second leg which extends over a portion of an adjacent one of said end walls.

9. The cartridge of claim 8 wherein said connector means further comprises at least one resilient sealing lip which extends substantially normal to an adjacent end cover second leg and is secured thereto and wherein said at least one sealing lip is spaced radially inwardly from said first leg.

10. A filter cartridge for treating a fluid passing therethrough, said cartridge comprising:
   a frame including a side wall having first and second ends;
   a filter medium which is adapted to be held in said frame;
   a pair of perforated end walls, one located at each end of said side wall;
   a pair of end connectors each securing a respective one of said end walls to a respective end of said frame; and,
   a seal means for securing said end covers to said frame in a substantially leak-proof manner, said seal means comprising a sleeve layer made of a thermoplastic material which covers and is heat shrunk onto said frame and at least a portion of each of said pair of end covers.

11. The cartridge of claim 10 wherein said frame is rectangular so as to include four planar side wall sections and wherein two of said side wall sections are secured to each other along a seam, said seal means extending over said seam.

12. The cartridge of claim 10 wherein said end covers each comprise a resilient body which is provided with a first groove for accommodating said frame side wall, a second groove for accommodating one of said perforated end walls, and a sealing lip extending approximately normal to said second groove.

13. The cartridge of claim 10 wherein said end connectors each comprise a resilient body which is provided with a first groove for accommodating said frame side wall and wherein a respective one of said perforated end walls is integral with said body, said body further comprising a sealing lip which extends approximately normal to said respective end wall.

14. The cartridge of claim 10 further comprising a seal member secured to each of said pair of end covers wherein said seal member faces away from said filter medium.

15. The cartridge of claim 14 wherein said end covers each comprise a rigid body which is provided with a first groove for accommodating said frame side wall and wherein a respective one of said perforated end walls is integral with said body, and wherein a respective seal member is secured adjacent said perforated end wall.

16. The cartridge of claim 10 wherein said end covers each comprise a picture frame-like end cover having a first leg which extends over a portion of said side wall and a second leg which extends over a portion of an adjacent one of said end walls.

17. The cartridge of claim 16 further comprising at least one sealing lip which is provided atop said end cover second leg and is spaced radially inwardly from said first leg.

18. A method for refurbishing a filter cartridge which is prone to fluid leakage, comprising:
   providing a filter cartridge having a frame including filter material and including a side wall and first and second perforated end walls which are each secured to a respective edge of said side wall by a respective one of first and second end covers;
   providing a heat shrinkable thermoplastic material;
   bringing said material and said filter cartridge into an adjoining relationship; and,
   heat shrinking said material onto said frame so that said material covers said side wall and at least a portion of each end cover thereby sealing said end covers to said frame.

19. The method of claim 18 wherein said plastic material is in the form of a sleeve and wherein said step of bringing comprises slipping said sleeve over said frame side wall.

20. The method of claim 18 wherein said plastic material is in the form of a tape and wherein said step of bringing comprises wrapping said tape in a plurality of overlapping windings around said frame side wall.

21. The method of claim 20 further comprising the step of adhering adjacent overlapping layers of said tape to each other during said step of heat shrinking.

* * * * *